United States Patent
Armstrong et al.

(10) Patent No.: US 8,200,754 B1
(45) Date of Patent: Jun. 12, 2012

(54) COMMUNICATIONS SYSTEM AND RELATED METHOD FOR AUTOMATIC CALL DISTRIBUTION

(75) Inventors: Ashley Armstrong, Huntsville, AL (US); Jason Amos, Albertville, AL (US)

(73) Assignee: Adtran, Inc., Huntsville, AL (US)

( * ) Notice: Subject to any disclaimer, the term of this patent is extended or adjusted under 35 U.S.C. 154(b) by 157 days.

(21) Appl. No.: 12/764,153

(22) Filed: Apr. 21, 2010

(51) Int. Cl.
*G06F 15/173* (2006.01)
*H04M 11/00* (2006.01)

(52) U.S. Cl. ...... 709/203; 709/220; 709/228; 379/88.13

(58) Field of Classification Search .................. 709/204, 709/224, 228, 203, 220; 370/352, 353; 379/88.13
See application file for complete search history.

(56) References Cited

U.S. PATENT DOCUMENTS

| | | | |
|---|---|---|---|
| 7,076,048 B2 | 7/2006 | Lee et al. | 379/265.01 |
| 7,185,094 B2 | 2/2007 | Marquette et al. | 709/225 |
| 7,203,186 B1* | 4/2007 | Fuller et al. | 370/352 |
| 7,239,629 B1* | 7/2007 | Olshansky et al. | 370/353 |
| 7,583,659 B2* | 9/2009 | Matsuhashi et al. | 370/352 |
| 7,734,030 B2* | 6/2010 | Pfaff et al. | 379/220.01 |
| 7,978,681 B2* | 7/2011 | Chung et al. | 370/351 |
| 2003/0165231 A1* | 9/2003 | Singh et al. | 379/265.09 |
| 2004/0003041 A1* | 1/2004 | Moore et al. | 709/204 |
| 2005/0141528 A1* | 6/2005 | Matsuhashi et al. | 370/401 |
| 2006/0291643 A1* | 12/2006 | Pfaff et al. | 379/221.12 |

* cited by examiner

*Primary Examiner* — Khanh Dinh
(74) *Attorney, Agent, or Firm* — Allen, Dyer, Doppelt, Milbrath & Gilchrist, P.A.

(57) ABSTRACT

In one non-limiting example, the system and method for communicating establishes a Session Initiation Protocol (SIP) communication session call between a caller and a communications server. The call from the caller is queued at the communications server. A first SIP Invite command is sent between a call agent station and the communications server to dequeue the call. A second SIP Invite command is sent between the call agent station and the communications server. The call is transferred to the call agent station to establish a communications session between the caller and the call agent station.

19 Claims, 5 Drawing Sheets

HFAA (HANDS-FREE AUTO ANSWER)

ns server and other
COMMUNICATIONS SYSTEM AND RELATED METHOD FOR AUTOMATIC CALL DISTRIBUTION

FIELD OF THE INVENTION

The present invention relates to communications systems, and more particularly, this invention relates to communications that use the Session Initiation Protocol (SIP).

BACKGROUND OF THE INVENTION

A communications server such as an Automatic Call Distributor (ACD) often queues a caller while the caller waits for live support. Some systems include a Private Branch Exchange (PBX) having circuitry and modules that allows the system or agent to manually dequeue one of these calls. Similar features occur in Private Branch Exchange (PBX) systems that generally offer a feature for call pick-up. This call pick-up feature allows one user to retrieve a call destined to a remote user as directed to or within a predefined group of users as a group. In both of these scenarios when Session Initiation Protocol (SIP) phones are involved, however, the media stream must be negotiated in an end-to-end fashion, without violation of the offer/answer model described in RFC3264, the disclosure which is hereby incorporated by reference in its entirety. This should not involve extra effort on the user's part, such as having to answer the phone after making the request.

SUMMARY OF THE INVENTION

In one non-limiting aspect, the dequeing endpoint is able to make a call to an extension that is then terminated while the queued call is transferred to the dequeing endpoint. This transfer of the call processes all necessary SIP Invites with or without the Session Description Protocol (SDP) to negotiate the appropriate media parameters. The system then forms a call to the dequeing endpoint using a ring type that allows the call agent station as a typical SIP phone to go off hook to retrieve the call either to a handset or speaker, without interaction of the user in what is termed a Hands-Free Auto Answer (HFAA).

In one non-limiting example, the system and method for communicating establishes a Session Initiation Protocol (SIP) communication session call between a caller and a communications server. The call from the caller is queued at the communications server. A first SIP Invite command is sent between a call agent station and the communications server to dequeue the call. A second SIP Invite command is sent between the call agent station and the communications server. The call is transferred to the call agent station to establish a communications session between the caller and the call agent station.

In one example, the call from the communications server to the call agent station is transferred without user interaction. The call is also dequeued by dialing an extension from an SIP phone at the call agent station and sending the SIP Invite command as a dequeing operation corresponding to a Session Description Protocol (SDP) offer and negotiating new and current media parameters. These new and current media parameters are negotiated using an SIP Invite command offer without any SDP media parameters to gain the new and current media parameters. In another example, it can be accomplished with the SDP media parameters.

In yet another example, the media is transferred to the call while the call is queued using the real time transport protocol (RTP). The SIP Refer command is used in another example for transferring the queued call to the call agent station. In still yet another example, a dialable extension is called from the call agent station to dequeue the call. This call agent station in an example is an SIP phone and can include a speaker phone. The communications server is typically formed as an Automatic Call Distributor (ACD).

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
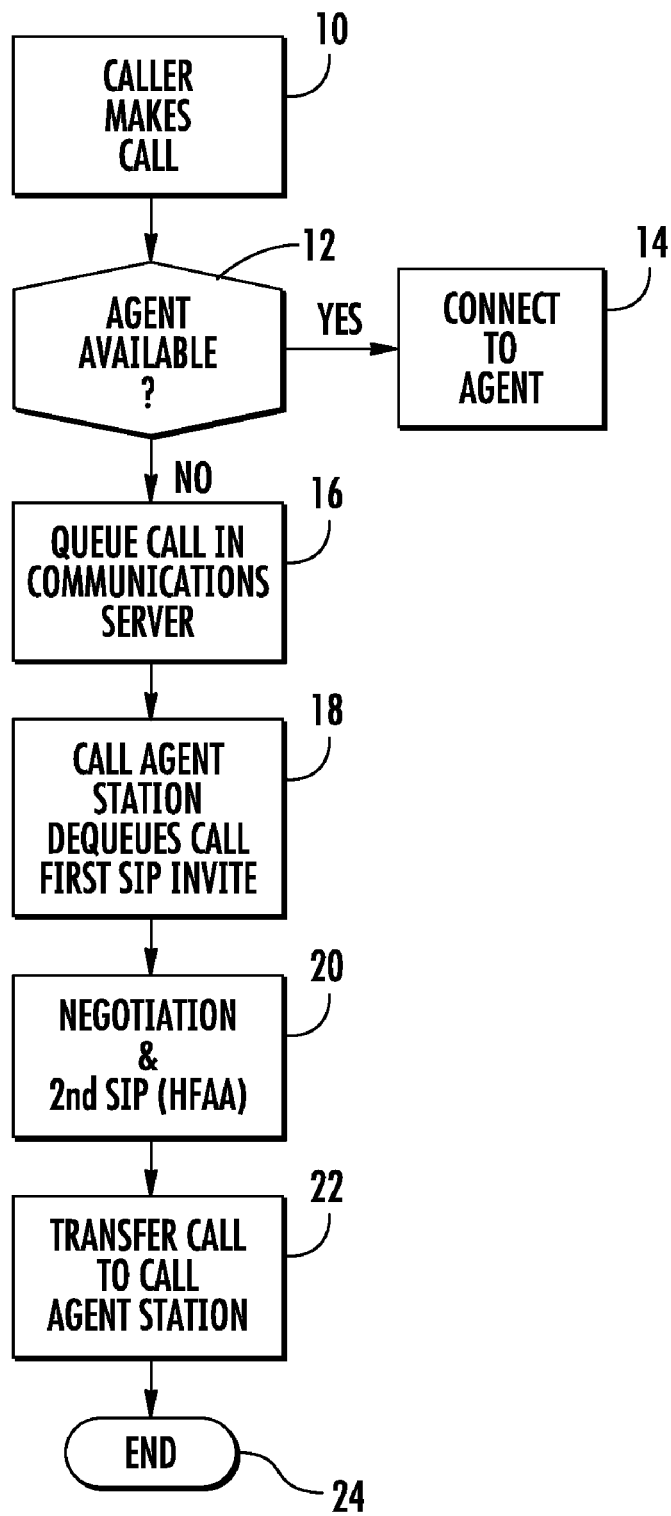
FIG. 1 is a high-level flowchart showing a method that can be used in accordance with a non-limiting example such as applied with a communications server that queues a call waiting for connection to a call agent station.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A communications server such as an Automatic Call Distributor (ACD) will queue callers that are waiting for live support. Some systems provide a feature that allows a call agent to dequeue manually one of these calls. When Session Initiation Protocol (SIP) phones are involved, the media stream should be negotiated in an end-to-end fashion without violation of the offer/answer model described in the incorporated by reference Request for Comments (RFC) 3264. This should be accomplished without involving extra effort on the user's part, such as having to answer the phone after making the request.

When initiating multi-media teleconferences, voice-over-IP (VoIP) calls, streaming video, or other media sessions, the media details, transport addresses and session description metadata are conveyed to participants using the Session Description Protocol (SDP) as the standard representation for this information. SDP is used irrespective of how that information is transported. SDP is a format for the session description, but does not incorporate any transport protocol. SDP conveys information about media streams in multi-media sessions to allow the recipients to participate in the session. SDP describes streaming media initialization parameters in an ASCII string in terms of a session announcement, session invitation, and parameter negotiation. It is a short, structured text description and conveys the name and purpose of the session and the media, protocols, CODEC formats, timing and transport information required for the session.

The Session Initiation Protocol (SIP) is an application-layer control protocol that creates, modifies and terminates sessions. The SIP messages create sessions and carry session descriptions that allow participants to agree on a set of compatible media types. These session descriptions are typically formatted using SDP. When used with SIP, the offer/answer model as set forth in RFC 3264 provides the framework for negotiation using SDP. The SDP includes a session name and purpose, the times the session is active, the media comprising the session, and information used to receive those media, for example, the addresses, ports, and formats. Entities use SDP to arrive at a common view of the multimedia session between them. In the offer/answer model, one entity offers the other entity a description of the desired session from their perspective, and the other entity answers with a desired session from their perspective. SIP uses this offer/answer model as its negotiation framework.

In the offer/answer model, a party indicates a desired session description from their point of view as the SDP offer, which contains the set of media streams the offerer wants to use, the desired characteristics of the media streams as qualified by a format parameter and media-line attributes, the IP addresses and ports where the offerer wants to receive the media, and additional parameters, if required, that qualify the media transport. The other party receives the offer and replies with an SDP answer accepting or rejecting the media stream. For example, if a media stream is not accepted, the port value in an m-line for media is set to zero. An answer typically includes the media stream's characteristics used for the session and the IP addresses and ports that the answerer wants to use to receive the media. It should be understood that the offer and answer is an "atomic" entity and there must be one of each. It must be negotiated every time. It can be the same information as a previous offer/answer. There still must be active negotiation.

In accordance with a non-limiting example, a dequeing endpoint is able to make a call to an extension that is terminated while the queued call is transferred to the dequeing endpoint. This transfer of the call processes all necessary SIP Invites with or without the Session Description Protocol (SDP) media parameters to negotiate the appropriate media parameters. It then forms a call to the dequeing endpoint using a ring type that allows the SIP phones to go off-hook (called Hands-Free Auto Answer) to retrieve the call either to a handset or a speaker, without interaction of the user that made the call.

FIG. 1 is a high-level flowchart showing an example of a method that can be applied in accordance with a non-limiting example. The caller initially makes the call that requires usually an agent to assist the caller such as ordering a product or other function (block 10). A determination is made if the agent is available (block 12) and if yes, then the caller is connected to the agent (block 14). If not, the communications server, such as the Automatic Call Distributor queues the call (block 16) such as in a queueing module or other memory device of the communications server. This communications server could also be a Private Branch Exchange (PBX) in a non-limiting example.

At this time a call agent station, such as having a live agent, dequeues the call typically by dialing an extension and making the first SIP Invite (block 18). Negotiation occurs for typically new and current media parameters and a second SIP Invite is made as a Hands-Free Auto Answer (HFAA) (block 20). The call is transferred to the call agent station (block 22), and the live agent receives the call and the communications session is established between the caller and the call agent station, i.e., typically the live agent. The process ends (block 24).

Figure 2:
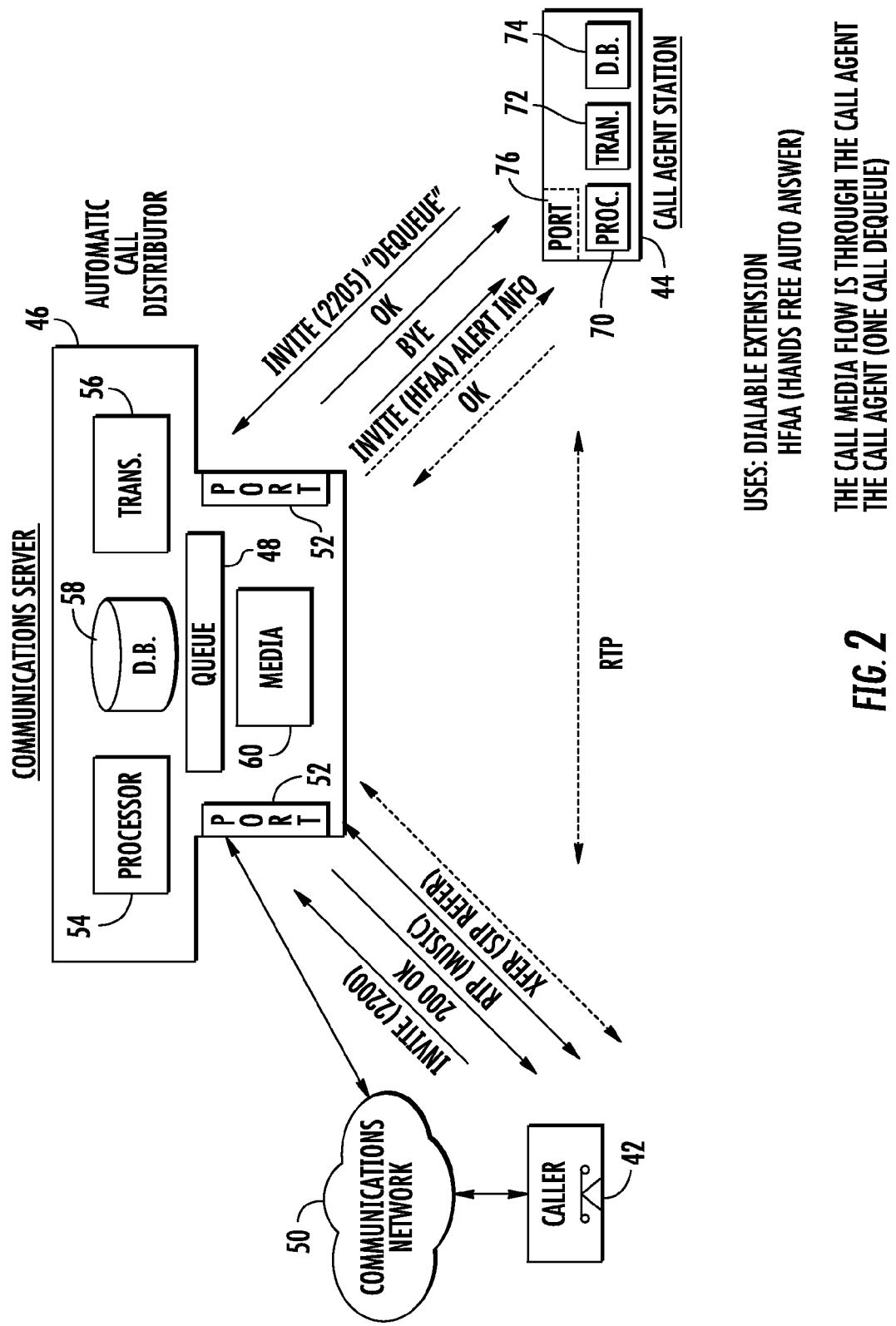
FIG. 2 is a high-level block diagram showing the communications system having a communicatio devices through which the method shown in FIG. 1 can be applied in accordance with a non-limiting example.

FIG. 2 is a high-level block diagram of a communications system 40 showing the various sequences between the caller 42 that makes the call, such as to obtain a live agent, and the call agent station 44. A call is initially established as an SIP call between the caller and the communications server 46 as an ACD in this example using the Invite command and an OK response. Music is transferred while the caller is held in queue 48 using the Real-Time Transport Protocol (RTP), which defines a standardized packet format for delivering audio and video over the internet. The "live" call agent at the call agent station 44 desires to dequeue the caller from the communications server as the ACD 46 and issues an Invite command. This is followed by OK back and Bye as illustrated. The Invite command is a call to an extension. The call agent at the call agent station 44 will typically dial four numbers as the extension for this dequeing operation. An Invite command as a Hands-Free Auto Answer (HFAA) is established as an alert and an OK established. The SIP Refer command is initiated to transfer the call between the caller and call agent, as illustrated.

It should be understood that the media in this particular example is established in the communications server as the ACD. In some techniques, a call agent could have a piece of software running on a personal computer, and the call agent in that example pushes a button to route. If the call agent at the call agent station does not have that functionality, however, and only has an SIP phone as in this example, then the call agent is limited in function. The system and method, in accordance with a non-limiting example, solves this technical problem. The system and method in one example creates a dialable number with the agent at the call agent station 44. When the call agent calls the dialable number, it is invoking the dequeing operation. The call is disconnected and the transfer occurs as noted above. The system and method further accomplishes a dialable number as the double SIP Invite (also termed Reinvite) as illustrated between the call agent and communications server as the ACD and the invoking of the SIP transfer. Internally, a Refer (XFER) command as an SIP transfer is initiated. This system and method as set forth is advantageous such that the call agent does not call the ACD and connect to a "box" as a media server in one example where both the agent and caller negotiate a call. This takes additional steps and processing.

The system and method as described has less messaging and ultimately removes the ACD 46 from the call signaling. If there were a number of media reinvites, this could create calls from both sides and create more overhead to the communications server as the ACD. The system and method as described is more efficient in the processing power and network usage.

FIG. 2 as described before is a high-level block diagram showing basic components that can be used with the method as described relative to the flowchart in FIG. 1. The caller can use typically any type of call device such as a telephone that makes the call to the number of either series of prompts or call agent, for example, when ordering a product. The call agent station 44 typically includes at least one live agent (and could include a group of live agents). The call is routed and transferred to the communications server 46 through a communications network 50 as an illustrated IP network in this example, but could be any network. The communications server 46 in this example is an Automatic Call Distributor, and includes functionality such as supported by a NetVanta 7000 series or 7100 series device, including Private Branch Exchange functionality such as manufactured by ADTRAN, INC. of Huntsville, Ala.

The communications server 46 includes communications ports 52 and a processor 54 and transceiver 56 that communicates and processes data packets for data communications and a database 58 for storing data. The media server 60 is included in this example and processes media and other data and interoperates with the other components. The call agent station 44 can include a plurality of different network devices such as an SIP phone or other network device and, in this example, the device typically includes a processor 70, transceiver 72, database 74 and communications ports 76. A number of live agents could be situated at the call agent station 44. These live agents could have different network devices and interspersed and geographically spaced network devices. As described before, the different data flows indicative of the SIP data transfer and negotiations are shown, including various SIP codes in this non-limiting example. For example, the Invite between the caller and communications server is an Invite (2200) and the Okay is a code 200. The Invite between the communications server 46 and the call agent station 44 is an Invite (2205) as a dequeue operation.

The communications system and method is described relative to FIGS. 1 and 2 as a communications server and as an Automatic Call Distributor, but the basic methodology is applicable with a Private Branch Exchange (PBX) type of system. These types of systems generally offer a feature for call pick-up that allows one user to retrieve a call destined to a remote user as a directed call or within a defined group of users as a group. When SIP phones are involved, the media stream in one example is negotiated in an end-to-end fashion without violation of the offer answer model described in the RFC3264, and without involving extra effort on the user's part, such as having to answer the phone after making the request.

In accordance with a non-limiting example, the system and method creates a forwarded call from the initial calling party to the pick-up requestor and uses a ring type that allows the SIP phone to automatically go off-hook as a Hands-Free Auto Answer (HFAA) to retrieve the call either to the handset or the speaker.

Figure 3:
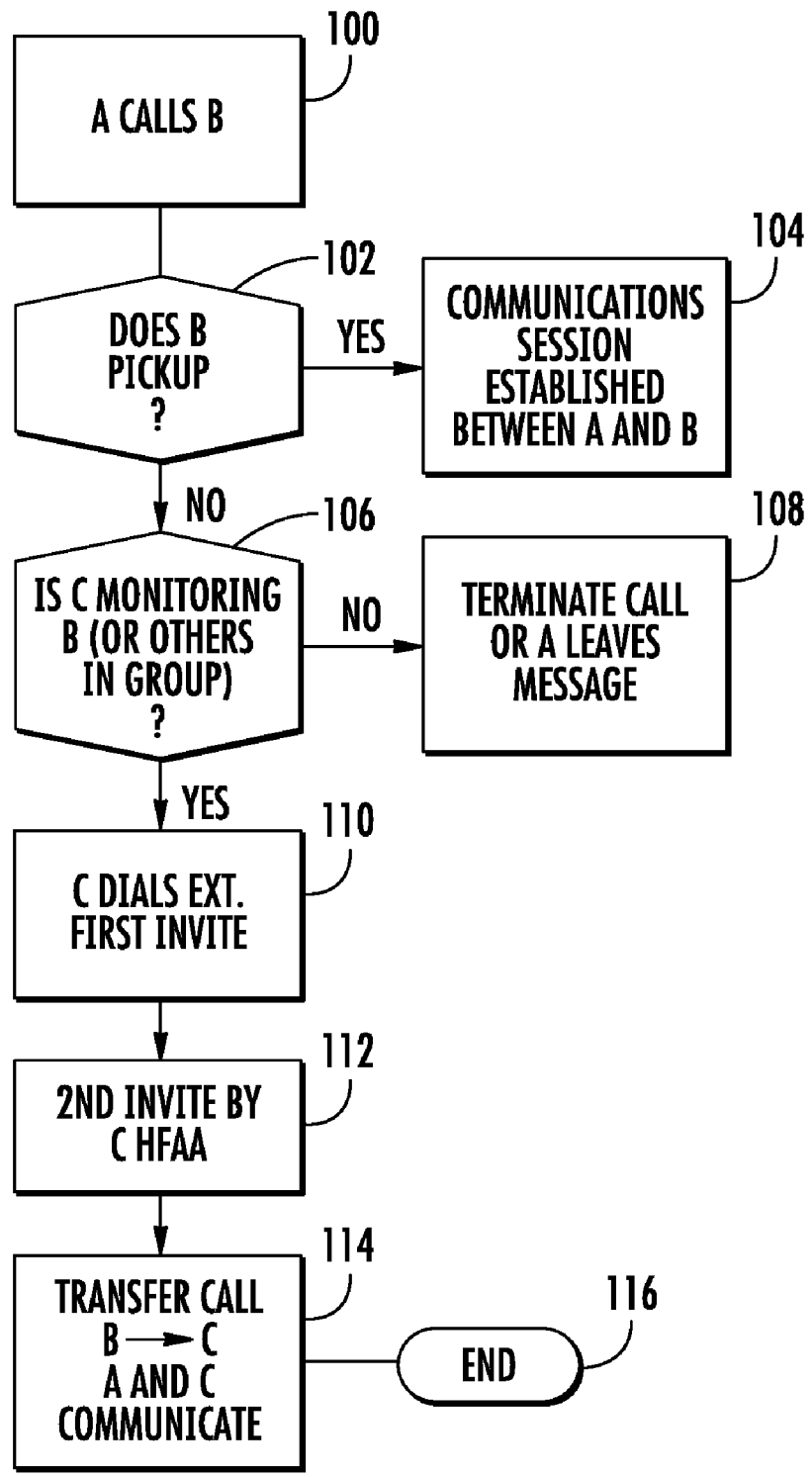
FIG. 3 is another high-level flowchart showing an example method as applied with a communications server as a Private Branch Exchange (PBX) in accordance with a non-limiting example.

FIG. 3 is a high-level flowchart illustrating an example method using a party A at a first call device that calls party B at second call device and party C at a third call device. Party C monitors party B in this example, such as being in the same office, next door, or part of a defined group.

In this non-limiting example, party A at the first call device calls party B at a second call device, while party C at a third call device is monitoring party B (block 100). A determination is made if party B picks up or answers (block 102), and if yes, the call is established between party A and party B for a communications session (block 104). If not, the system determines if party C is monitoring party B such as through an indicator or other means (block 106), and if not, the call is terminated or party A may leave a message such as through prompting (block 108). If yes, then party C dials an extension for a first SIP Invite command (block 110). This first SIP Invite command is sent from the third call device to the communications server as a pick-up call and instruction for the call to the second call device when it has not answered the call from the first call device. A second SIP Invite command is sent between the third call device and communications server (block 112). The call is transferred from party B as the second call device to party C as the third call device to establish a communications session between party A and party C as first and third call parties (block 114). The process then ends (block 116).

As indicated before, party C is monitoring party B and notices the ring after party B receives the call and the SIP device rings. This monitoring could be by hearing the ring as an audible indicator (a buzzer or phone ring) or a digital indicator such as a blinking light or other means located at party C. The call from party A was originally into the server as a Private Branch Exchange (PBX) in this communications server example and the call routing could be through a telecommunications network as a cellular network, PSTN or any other type of communications network into the PBX. Party C could be located at a desk next to party B in this particular example, such as close working coworkers. Party B may not currently be present or could be located in party C's office. In this example, party B is not able to answer his or her SIP phone and party C is aware of that fact. Party C notices the SIP phone of party B ringing either through the audible indicator or digital indicator in a non-limiting example. Party C now desires to pick up the call and take it from party B. To accomplish that, party C invokes the system and method as described. It should be understood that party B and party C could be part of a defined group and the call from the communications server as the PBX could be directed generally to the group, which includes parties B and C.

Figure 5:
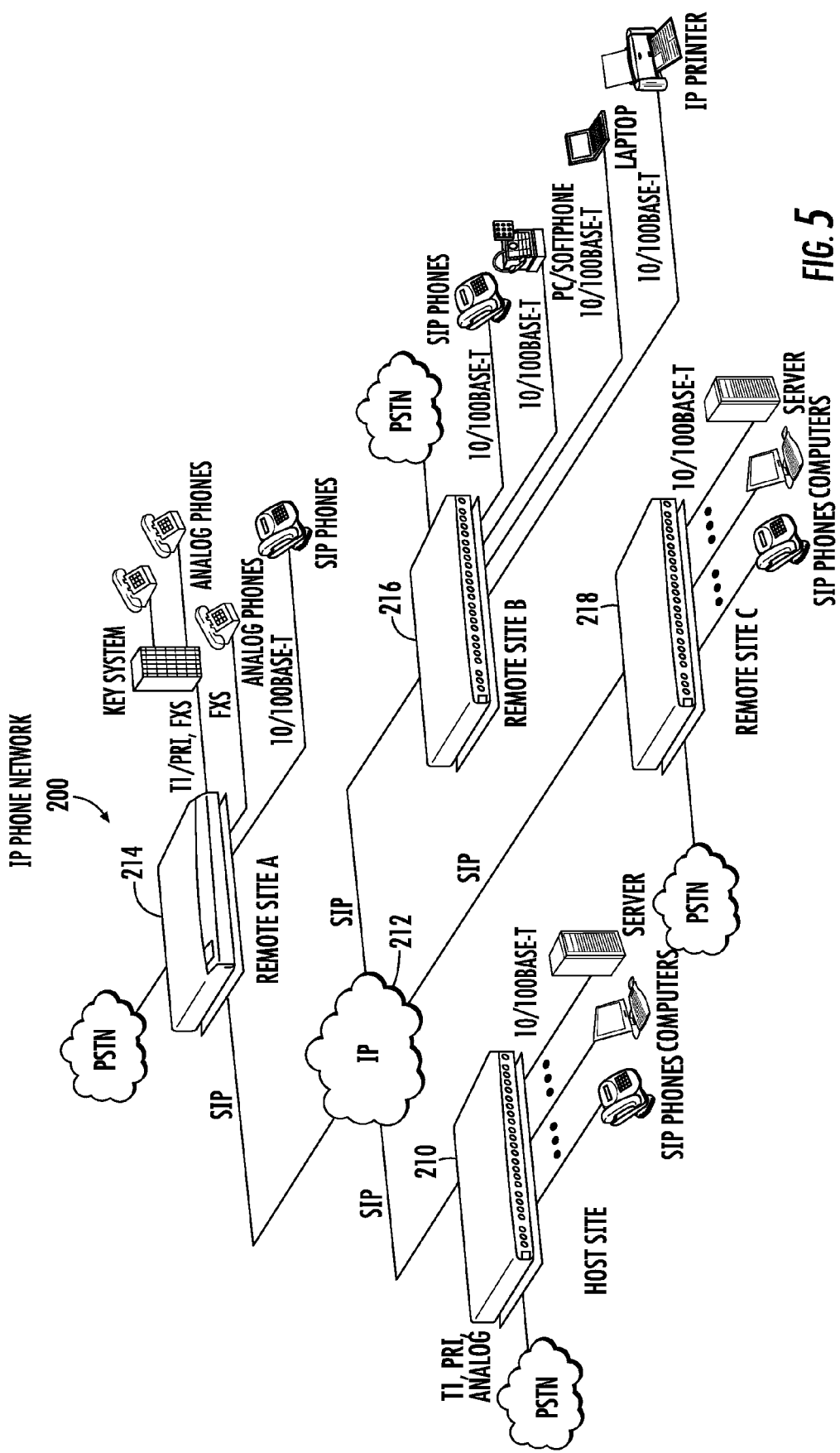
FIG. 5 is an example of a communications system that can use the method as described and incorporate components of the communications systems shown in FIGS. 2 and 4 in accordance with a non-limiting example.

FIG. 5 shows a communications server 146 that is connected to a first call device 120, a second call device 122, and a third call device 124 as explained before which includes respective party A, party B and party C at the respective first, second and third call devices. The communications server 146 in this example is a call control agent as a PBX in a non-limiting example and includes basic components as described before (and given reference numerals in the 100 series) such as the ports 152, processor 154, transceiver 156, and database 158 and could include a media server 60 and Queue module 148. The call agent station 124 as the third call device could include typical components such as described relative to the call agent station of FIG. 2, such as the processor 170, transceiver 172, database 174 and ports 176. The call is made between party A and party B as illustrated and the call is transferred to party B through the communications server 146. The call is cleared. Party C understands that party B is not available and performs the pick-up call for party B using the first Invite (although not illustrated in detail) and the response as a pick-up group call response with the session terminated. The Hands-Free Auto Answer (HFAA) is made that includes the double Invite as described before such that the call is then transferred and the communications session established between party A and party C.

SDP is a format typically used for describing the streaming media initialization parameter in an ASCII string. It describes the different multimedia communication sessions, including announcement and invitation and negotiation. SDP commands are used for negotiation between the endpoints of media types and not for communicating the data itself. The data is transported in a packet format in accordance with the Real-Time Transport Protocol (RTP). RTP is a standardized packet format for delivering audio and video over an internet and involves typically streaming media. The packets can carry media streams controlled by H.323 and the Session Initiation Protocol (SIP) signaling protocols. RTP allows end-to-end, real-time transfer of the multimedia data.

In RTP, the sequence number is typically 16 bits and increments by one for each RTP data packet while the timestamp reflects the sampling instant of the first octet in the RTP data packet. By implementing the session and delivering media to the user in this packet format, it is possible to reuse the same network socket as the source IP and port numbers and update RTP timestamps and sequence numbers and transfer the media to the user with minimal jitter buffer flushes and network resource usage.

Figure 4:
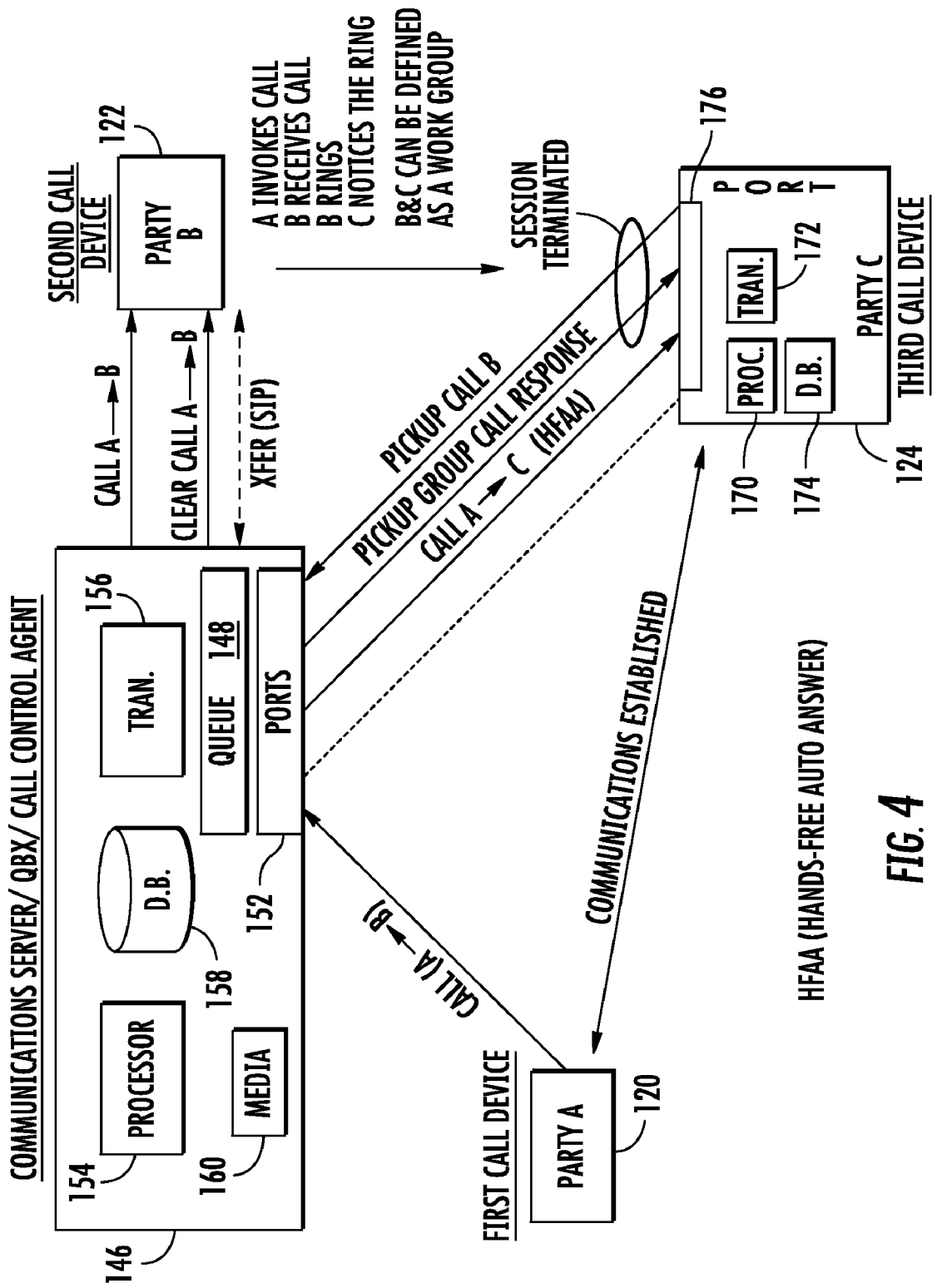
FIG. 4 is a high-level block diagram showing a communications system having a communications server and other network devices through which the method shown in FIG. 3 can be applied in accordance with a non-limiting example.

The media server 60,160 as shown in FIGS. 2 and 4 at the communications server is "on the box," i.e., integrated with the communications server, instead of external to that device, but it could be external. Any timestamps and sequence numbers can be negotiated for packets. Any audio is passing through RTP streams with the updated sequence numbers and timestamps to make consecutive across any switchovers. It should be understood that buffering can be in the phone at the caller (phone).

In one non-limiting example, the system can integrate media servers to the communications server of a number of different media servers that are internal to the communications server. Thus, it is possible to use elements in C data structures passed as a message between internal media servers. When switching between media servers, the system passes the information about the last RTP packet sent to the caller by the previous media server. The system knows where the new media server should start any of its timestamps and sequence numbers. The system passes the last RTP timestamp, sequence number and the real time of the last packet sent. Because it knows the actual time the last packet was sent, the new media server can determine how much to increment the last timestamp it was provided. Any sequence number is easier to deal with because it is simply incremented and does not have to take the passage of time involved in the switchover of media servers.

There now follows a general description of a larger IP phone network as a general description to show a more specific and larger network example to which the example can be applied. FIG. 5 is a system diagram of an Internet Protocol (IP) telephone system 200 that includes various network components and devices as shown in FIGS. 2 and 4 and other interconnected platforms, switches and servers. It should be understood that the system 200 shown in FIG. 5 is only one non-limiting example of an IP telephone system that uses an example network device as communications server 210 for different functions, including a switch. This series of devices can include a NetVanta 7000 or 7100 device as manufactured by ADTRAN, INC. of Huntsville, Ala. In one aspect, the NetVanta 7100 is a communications server as an all-in-one office-in-a-box that provides voice and data solutions, including Private Branch Exchange (PBX) functionality.

FIG. 5 shows the communications server 210 (such as the NetVanta series 7000/7100) connected to an IP network 212, which uses SIP communications to various remote sites (A-C), which each include other devices that could operates as a communications server. Each of the remote sites includes a network device 214, 216, 218 of remote sites A, B and C respectively, that operate as communications servers such as IP business gateways. For example, remote site A could include an IP gateway device 214 such as the Total Access 900 manufactured by ADTRAN, INC. of Huntsville, Ala. Remote site B could include a NetVanta 6355 as an IP gateway device 216. Remote site C could include another communications device 218 similar to that at the host site, which includes a NetVanta 7100 device. These are only examples for purposes of description. All of these communications devices operate as network switches and include other functionality. For example, the device 214 at remote site A connects to a key system and various analog phones through a communications system and an SIP phone. The device at remote site A also connects to a PSTN. The device 216 at remote site B connects to the PSTN and an SIP phone, a PC/soft phone, a laptop and an IP printer as illustrated in that network. The device 218 at remote site C connects to the PSTN and an SIP phone, a computer and a server. The host site connects to the PSTN and also SIP phones, computers and a server through various communications connections and ports as illustrated.

There now follows a more detailed description of the communications server 210 as shown at the host site and described as a NetVanta 7000 series, and in this particular example, as a NetVanta 7100 for purposes of general understanding and description. This description can apply to other devices at the other remote sites.

In this device as the communications server 210, a single chassis can provide a LAN-to-WAN infrastructure and Quality of Service (QoS) that maintains voice quality and includes a Graphical User Interface (GUI) for network set-up and facilitate installation and system administration.

In this example, this communications server can allow a converged IP voice and data network with a full-function IP PBX for voice. It can include an integrated Power Over Ethernet (POE) switch-router for data in an integrated device and a Virtual Private Network (VPN) for secure internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules could include T1 and ADSL Network Interface Modules (NIMs). Analog (FXS, FXO) Voice Interface Modules (VIMs) can be included with T1, PRI voice interface modules and fiber SFP modules.

The communications server 210 in this example is an integrated communications platform and includes capability of a fast Ethernet switch with Gigabit uplinks and expansion slots for the network interface modules and voice interface modules. The IP telephone system 200 as illustrated includes voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. The device can operate as an integral SIP gateway with the appropriate FXS and FXO analog interfaces to support analog phones, fax machines, modems and credit card readers. The integrated voice mail can include 3,000 messages on eight ports and multi-level auto-attendant that are multi-level on eight ports in the example of the NetVanta 7000 series. The device includes, in one example, a full function IP access router and an integrated state inspection firewall protects against the Denial-of-Service (DOS) attempts. The devices include IP Sec VP and tunnelling with DES/3DES/AES encryption and an SIP-aware firewall, and include T.38 support and a door relay, music-on-hold (MOH) interfaces and Voice Quality Monitoring (VQM).

SIP networking is supported between multiple locations such that a business can connect multiple sites and have three or four digit dialing and local call routing and survivability and on-net calls for toll bypass. Multiple SIP trunks allow one communications server to connect to other communication servers, such as a Total Access series device as manufactured by ADTRAN, INC. Up to ten or more remote SIP trunks can be supported and connect to all endpoints at all locations such that a user can have local voice mail and auto-attendant services. A hub and spoke SIP network can be accomplished in another example. A dedicated communications server such as shown in FIGS. 2 and 4 and also used in the IP phone system of FIGS. 2 and 4 can aggregate SIP trunks at a central location, which for qualified applications, increases the number of other communication servers that can be networked together.

The user can use an Internet Protocol (IP) phone such as an IP 700 series of telephones with six or twelve line versions and support multiple call functions. It is possible to incorporate voice mail-to-email applications and personal auto-attendant in which each phone sets up their own automatic attendant. It is also possible for the communications server to ring a series of stations and one external phone number. The server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for the communications server to work in a multi-vendor environment and with an integrated T1-PRI trunk to consolidate separate voice lines and internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

This application is related to copending patent applications entitled, "SYSTEM AND METHOD FOR CALL TRANSFER WITHIN AN INTERNET PROTOCOL COMMUNICATIONS NETWORK," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of communicating, comprising:
 establishing a Session Initiation Protocol (SIP) communications session call between a SIP caller and a communications server using a call setup SIP Invite command;
 queueing the call from the SIP caller at the communications server to place the SIP caller on hold;
 sending a first SIP Invite command as a call to a dialable extension from a call agent station to the communications server to dequeue the call of the SIP caller who is on hold;
 sending a second SIP invite command between the call agent station and the communications server as an alert indicative to transfer the call from the SIP caller to the call agent station; and
 initiating an SIP Refer command between the SIP caller and the communications server and transferring the call to the call agent station to establish a communications session between the caller and the call agent station without user interaction.

2. The method according to claim 1, further comprising dequeuing the call by dialing an extension from an SIP phone at the call agent station and sending the SIP Invite command as a dequeuing operation corresponding to a Session Description Protocol (SDP) offer and negotiating new and current media parameters.

3. The method according to claim 2, further comprising negotiating new and current media parameters using an SIP Invite command offer without any SDP media parameters to gain the new and current media parameters.

4. The method according to claim 2, further comprising negotiating new and current media parameters with SDP media parameters.

5. The method according to claim 1, further comprising transferring media to the caller while the call is queued using the Real Time Transport Protocol (RTP).

6. The method according to claim 1, further comprising forming the call agent station as an SIP phone.

7. The method according to claim 1, further comprising forming the communications server as an Automatic Call Distributor (ACD).

8. A method of communicating, comprising:
 establishing a Session Initiation Protocol (SIP) communications session call between a SIP caller and a communications server using a call setup Invite command;
 queueing the call from the SIP caller at the communications server to place the SIP caller on hold;
 dequeuing the call by dialing an extension from an SIP phone at a call agent station and sending an SIP Invite command as a dequeuing operation corresponding to a Session Description Protocol (SDP) offer;
 sending a second SIP invite command between the call agent station and communications server as an alert indicative to transfer the call from the SIP caller to the call agent station and negotiating new and current media parameters; and
 transferring the call to the call agent station based on the new and current media parameters by initiating an SIP Refer command between the SIP caller and communications server to establish a communications session between the caller and call agent station without user interaction.

9. The method according to claim 8, further comprising negotiating new and current media parameters using an SIP Invite command offer without any SDP media parameters to gain the new and current media parameters.

10. The method according to claim 8, further comprising negotiating new and current media parameters with SDP media parameters.

11. The method according to claim 8, further comprising transferring media to the caller while the call is queued using the Real Time Transport Protocol (RTP).

12. The method according to claim 8, further comprising forming the communications server as an Automatic Call Distributor (ACD).

13. A communications system, comprising:
 a call agent station configured to communicate in accordance with the Session Initiation Protocol (SIP); and
 a communications server connected to said call agent station, and further comprising a queuing module, processor and transceiver configured to transmit and receive packet communications in accordance with the Session Initiation Protocol (SIP), said server configured to receive from a SIP caller a call setup SIP Invite command and establish a SIP call and queue the call within the queuing module while placing the SIP caller on hold and waiting for live support from a call agent station to take the call, wherein said communications server is configured to receive a first SIP Invite command from the call agent station as a dialed extension to dequeue the call of the SIP caller who is on hold, and communicate a second SIP Invite command with the call agent station as an alert indicative to transfer the call from the SIP caller to the call agent station and to initiate an SIP Refer command with the SIP caller to transfer the SIP call and establish a communications session between the SIP caller and the call agent station without user intervention.

14. The communications system according to claim 13, wherein said communications server and call agent station are configured to dequeue the call with a dialable extension from an SIP phone at the call agent station and as a dequeue operation corresponding to a Session Description Protocol (SDP) offer as part of an SIP Invite to negotiate the new and current media parameters.

15. The communications system according to claim 14, wherein communications server and call agent station are configured to negotiate new and current media parameters using an SIP Invite command offer without any SDP media parameters to gain the new and current media parameters.

16. The communications system according to claim 14, wherein said communications server and call agent station are configured to negotiate new and current media parameters with SDP media parameters.

17. The communications system according to claim 13, wherein said communications server is configured to transfer media to the caller while the call is queued using the Real Time Transport Protocol (RTP).

18. The communications system according to claim 13, wherein said call agent station comprises an SIP device phone.

19. The communications system according to claim 13, wherein said communications server comprises an Automatic Call Distributor (ACD).

* * * * *